United States Patent
Williams et al.

(10) Patent No.: US 7,346,577 B1
(45) Date of Patent: Mar. 18, 2008

(54) THIRD-PARTY BILLING SYSTEM AND METHOD

(75) Inventors: Christopher K. Williams, Arlington, VA (US); Justin M. Kayatin, Baltimore, MD (US)

(73) Assignee: Javien Digital Payment Solutions, Inc., McLean, VA (US)

( * ) Notice: Subject to any disclaimer, the term of this patent is extended or adjusted under 35 U.S.C. 154(b) by 985 days.

(21) Appl. No.: 09/648,877

(22) Filed: Aug. 28, 2000

(51) Int. Cl.
*G06Q 40/00* (2006.01)

(52) U.S. Cl. .......................... 705/40; 705/34

(58) Field of Classification Search ............... 705/1, 705/10–44
See application file for complete search history.

(56) References Cited

U.S. PATENT DOCUMENTS

| | | |
|---|---|---|
| 5,590,197 A | 12/1996 | Chen et al. |
| 5,671,279 A | 9/1997 | Elgamal |
| 5,671,280 A | 9/1997 | Rosen |
| 5,692,132 A | 11/1997 | Hogan |
| 5,696,965 A | 12/1997 | Dedrick |
| 5,708,780 A | 1/1998 | Levergood et al. |
| 5,710,887 A | 1/1998 | Chelliah et al. |
| 5,715,314 A | 2/1998 | Payne et al. |
| 5,724,424 A | 3/1998 | Gifford |
| 5,737,414 A | 4/1998 | Walker et al. |
| 5,745,886 A | 4/1998 | Rosen |
| 5,757,917 A | 5/1998 | Rose et al. |
| 5,771,282 A * | 6/1998 | Friedes ................. 379/121.03 |
| 5,794,221 A | 8/1998 | Egendorf |
| 5,815,657 A | 9/1998 | Williams et al. |

(Continued)

OTHER PUBLICATIONS

Origin Universal News Services, Limited, 1999, Universal News Services, "Ambalink Launches Secure Online Shopping in the UK", Jun. 8, 1999.*

(Continued)

*Primary Examiner*—Frantzy Poinvil
(74) *Attorney, Agent, or Firm*—McGuireWoods LLP

(57) ABSTRACT

A third-party billing system and method permits consumers to conduct e-commerce transactions (including microtransactions) securely and anonymously by providing billing and personal information to the third party billing system rather than to merchants. A consumer initiates a transaction by placing an order for a product. The consumer then authorizes the transaction by transmitting an authorization code to a billing computer. The authorization code identifies the consumer billing account to which the transaction is to be charged. The authorization code can also authenticate the consumer through use of a PIN. Multiple consumers can charge transactions to one billing account, in which case each consumer can be assigned a different PIN with restrictions that limit that consumer's use of the account. The billing computer then verifies the authorization code and transmits an approval code to the merchant computer. To fulfill the transaction, the consumer sends a fulfillment request and a consumer identifier to the merchant computer. The consumer identifier can be anonymous, meaning that it identifies only the destination to which the product is to be delivered. If that consumer identifier matches a second consumer identifier that the consumer sends to the billing computer, the merchant computer then delivers the product to the consumer. The billing computer can charge the transaction to the consumer billing account directly, or it can aggregate the transaction for later charging of an aggregated total. The billing computer can also obtain a charge preauthorization to ensure that the billing account can accommodate the charging of aggregated transactions.

12 Claims, 9 Drawing Sheets

U.S. PATENT DOCUMENTS

| | | | |
|---|---|---|---|
| 5,815,665 | A | 9/1998 | Teper et al. |
| 5,870,473 | A | 2/1999 | Boesch et al. |
| 5,883,810 | A | 3/1999 | Franklin et al. |
| 5,884,280 | A | 3/1999 | Yoshioka et al. |
| 5,905,736 | A | 5/1999 | Ronen et al. |
| 6,000,832 | A * | 12/1999 | Franklin et al. ............ 700/232 |
| 6,016,504 | A | 1/2000 | Arnold et al. |
| 6,175,922 | B1 | 1/2001 | Wang |
| 6,182,894 | B1 | 2/2001 | Hackett et al. |
| 6,267,292 | B1 | 7/2001 | Walker et al. |
| 6,473,740 | B2 * | 10/2002 | Cockrill et al. ............... 705/27 |
| 6,529,725 | B1 * | 3/2003 | Joao et al. .................. 455/406 |

OTHER PUBLICATIONS www.mypublish.com, web page published Jul. 20, 2000.
www.netbill.com, web page published Jul. 20, 2000.
www.wave.com, web page published Jul. 20, 2000.
Herzberg, Safeguarding digital library contents. Charging for online content, D-Lib Magazine, Abstract, Jan. 1998.
Birch, Publishing and profits in the new economy, Abstract, 1997.
Riedman, Cybergold Revamp Makes Spending Easy, Mar. 8, 1999, p. 44.
Kuykendall, The Online Challengers, Nov. 1999, p. 78.
Essex, Big Dreams For Tiny Money, Dec. 13, 1999, p. 66.
Business Wire, Merchants and CSPs Gain Competitive Edge with Enhanced Shopping Experience Functionally from GlobelD, Dec. 8, 1999, p. 0628.
Bonisteel, Future Bright for Digital Cash, Nov. 5, 1999, Abstract.
Hudgins-Bonafield, Simplicity Lies at the Heart of iPin's New Online payment Scheme, Oct. 4, 1999, p. 24.
Card News, FirstNet Challenges Big Issuers On the Internet, Jul. 28, 1999, Abstract.
Kruger, How to put the e in telco, Jun. 1999, p. 6(5).
Hamblen, Trivnet offers payment service using ISP, May 17, 1999, p. 6(1).
Smalley/Patch, Drop a dime online Micropayments were declared DOA a few years ago, but advances in smart cards and software may revive the virtual penny, Nov. 30, 1998, p. 71(1).
Bank Technology News, Scoping Out Electroinc Billing, Sep. 1, 1998, Abstract.
Liebmann, E-Commerce: The Payoffs Of Faith, May 1, 1998, Abstract.
Kruger, ISPs struggling with micro-payments, Aug. 11, 1997, p. 29.
Mason, E-Commerce May Not Be A Huge Success Yet, But It Soon Will Be, Apr. 28, 1997, p. 53.
PR NEWSWIRE, Clickshare Launches Internet's First Micropayments Service, Sep. 16, 1996 p. 0916NEM018.
PC WEEK, Making Change, Mar. 18, 1996, P. A01.
Herzberg, A.; "Safeguarding Digital Library Contents—Charging for Online Content"; D-Lib Magazine; Jan. 1998.
Kuykendall, Lavonne, "The Online Challengers", Credit Card Management, vol. 12, No. 8, Nov. 1999, p. 78.
"FirstNet Challenges Big Issuers on the Internet", Card News, vol. 14, No. 14, Jul. 28, 1999 (author unknown).
"Clickshare Launches Internet's First Micropayments Service", PR Newswire New Network, Sep. 16, 1996 (author unknown).
O'Mahony, D., Pierce, M. and Tewari, H. Electronic Payment Systems, 1997 (Artech House Publishers).
CCBill Services Overview; http://about.ccbill.com/services.html.
"Clickshare Enables Billable Hypertext Links"; http://www.clickshare.com/info/diagrams/chart1.shtml.
"Payment mechanisms designed for the Internet"; http://ganges.cs.tcd.ie/mepeirce/Project/oninternet.html.
"W3C Technology and Society Doman: Micropayments Overview"; http://www.w3.org/Ecommerce/Micropayments/Overview.html.

* cited by examiner

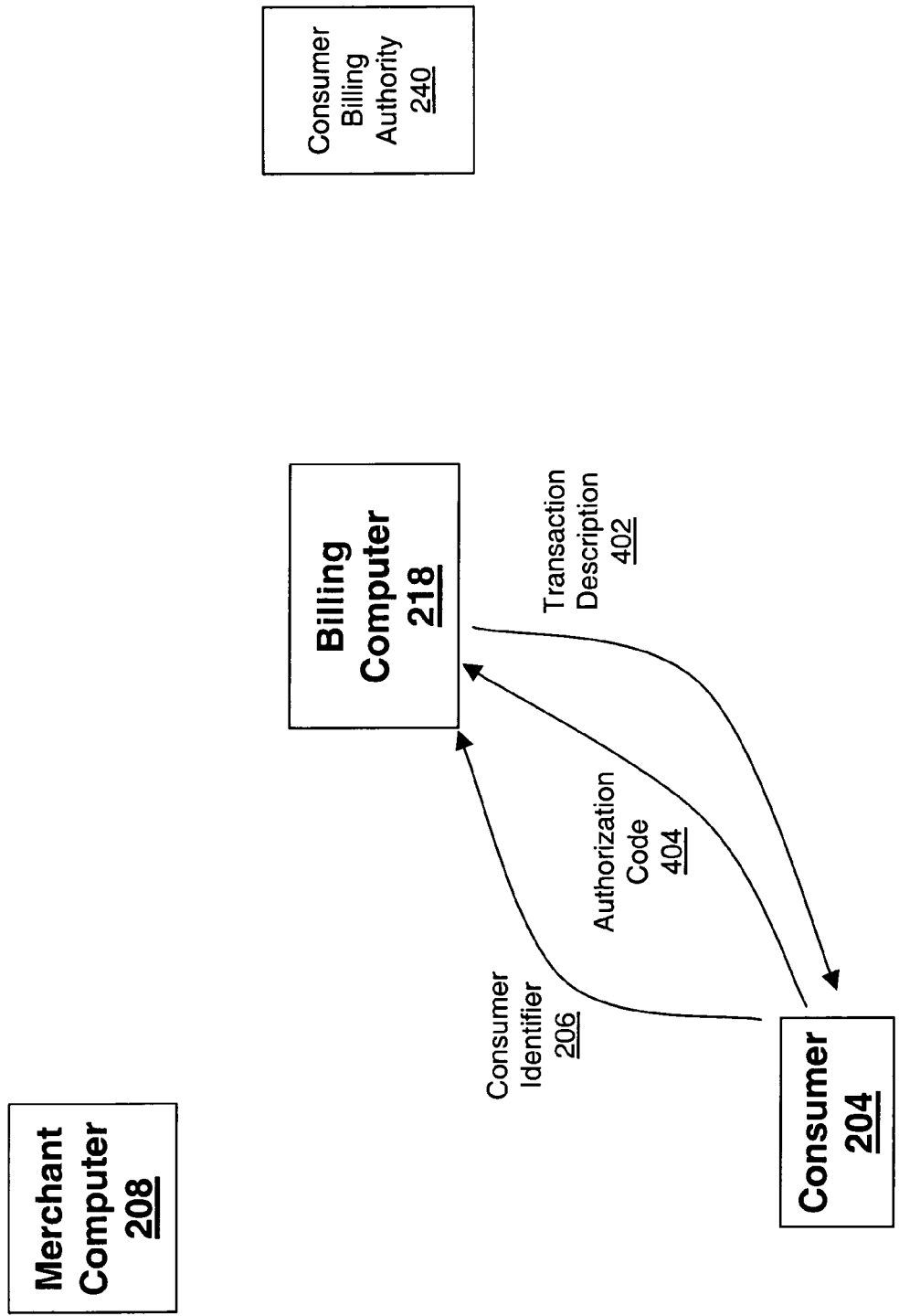

THIRD-PARTY BILLING SYSTEM AND METHOD

FIELD OF THE INVENTION

The present invention relates to electronic commerce systems and methods, and more specifically, to a third-party billing system and method that allows consumers to purchase products and services from online merchants by providing billing information to the third party billing system rather than to merchants.

BACKGROUND OF THE INVENTION

Consumers are ordering products and services over computer networks such as the Internet in increasing numbers. FIG. 1 shows a typical electronic commerce (e-commerce) system used to conduct online transactions. Consumer 104 usually accesses a computer network such as the Internet through a browser program, and searches through product descriptions located at a merchant's world wide web site on merchant computer 108. After consumer 104 selects a product and places an order for it with merchant computer 108, consumer 104 typically sends billing information (such as a credit card number), as well as additional personal information (such as a postal address, a telephone number, or an e-mail address), to merchant computer 108. Merchant computer 108 then requests authorization from consumer billing authority 140 (e.g., a credit card payment processor) to charge the transaction to a consumer billing account identified by the billing information provided by consumer 104. After receiving authorization from consumer billing authority 140, merchant computer 108 notifies consumer 104 that the transaction has been authorized, and delivers the product to consumer 104.

There are numerous drawbacks associated with such prior art e-commerce systems. For example, consumers must provide their billing information to all the merchants from whom they wish to purchase products or services. This poses a security risk to consumers, since unscrupulous merchants can use that information to conduct unauthorized transactions. Moreover, consumers must also provide their personal information to merchants, who can use that identifying information to flood consumers with unsolicited mail, telephone calls, and advertisements. Merchants can also sell consumers' personal information, as well as information about the products or services purchased by specific consumers, to advertising companies or to companies that can compile detailed histories of the spending and purchasing habits of consumers. Many potential consumers are reluctant to engage in online transactions for fear that in doing so they can compromise not only the security of their billing accounts, but also their own privacy.

Merchants are also inconvenienced by prior art e-commerce systems because they must implement their own billing solution, which can be costly, time consuming, and technically difficult to integrate into their web site. In addition, merchants must also build extra security mechanisms into their web site in order to prevent hackers from breaking into their system and gaining access to databases with consumer account and billing information.

Another drawback of prior art e-commerce systems is that they are not set up to handle "microtransactions." Microtransactions are transactions that involve small amounts of money, such as two dollars or less. The relatively high fees associated with processing such transactions prohibit merchants from making microtransactions available to consumers. This is an especially significant shortcoming on the Internet because consumers are much more likely to buy small-value items (such as a $0.50 news article, picture, or song) than large-value items (such as a $20 newspaper subscription or album).

Accordingly, there exists a need for an electronic commerce system and method that allows consumers to conduct transactions securely, confidentially, and without the aforementioned problems and inconveniences.

SUMMARY OF THE INVENTION

The present invention is directed to a system and method for conducting transactions between a consumer, a merchant computer, and a billing computer that are connected together by a computer network. In a typical transaction, the consumer wishes to purchase a product or service from the merchant computer. The product or service can comprise digital content. Non-limiting examples of digital products include online publications, digital images, computer software, search results obtained from searching electronic databases, and any other information that merchants can provide to consumers for a fee. The consumer intends to pay for the product or service by charging the transaction to a consumer billing account, preferably one that has been pre-established (e.g., an existing credit card). Examples of billing accounts include credit card accounts, debit card accounts, smart card accounts, checking accounts, and any account that allows consumers to pay for a purchase by merely providing an identification of the account to a merchant or other party. The system and method of the present invention allow consumers to conduct such transactions without disclosing the identity of a billing account (or other information related to the account) to merchants. Instead, consumers provide such billing information to a trusted third-party billing system.

The advantages of the present invention are provided by a method of conducting transactions that includes the steps of initiating a transaction, authorizing the transaction by having the consumer transmit an authorization code to the billing computer, and fulfilling the transaction.

The transaction can be initiated by transmitting an order for a product or service to a merchant computer. The merchant computer can transmit information relating to the order to a billing computer, which can respond by returning a transaction identification code. The merchant computer can transmit the transaction identification code to the consumer, and direct the consumer to contact the billing computer in order to authorize the transaction. In an alternative embodiment, the transaction can be predefined, and the merchant computer can return a transaction identification code to the consumer without first contacting the billing computer. In yet another embodiment, the consumer can initiate a predefined transaction by placing an order directly with the billing computer.

The transaction is then authorized by the consumer. The billing computer can transmit a description of the transaction to the consumer, so as to verify the details of the transaction. Assuming the consumer wishes to authorize the transaction, the consumer transmits an authorization code to the billing computer. The authorization code contains billing information that identifies the consumer billing account to which the consumer wishes to charge the transaction. The authorization code can also contain authentication information such as a password or a Personal Identification Number (PIN), which adds a layer of security to the consumer's billing account. In an alternative embodiment in which multiple consumers are permitted to charge transactions to the same billing account, each consumer is issued a separate PIN. Each PIN can be associated with restrictions that limit the corresponding consumer's use of the billing account.

After the consumer authorizes the transaction, the billing computer determines whether to approve the transaction. The billing computer makes such a determination by considering the authorization code provided by the consumer. The billing computer can also consider authentication information provided by the consumer, as well as other information about the transaction. The billing computer can also consider the result of an authorization request placed with a consumer billing authority before approving the transaction. After the billing computer makes its approval determination, it transmits an approval code to the merchant computer, indicating whether or not it has approved the transaction.

Assuming the transaction is approved by the billing computer, it is then fulfilled. Transaction fulfillment can be as simple as delivery of the product or service to the consumer. The merchant computer can additionally send an acknowledgment to the billing computer.

In an alternative embodiment, the consumer transmits a fulfillment request and a consumer identifier (sufficient to associate the consumer with the transaction but not necessarily to reveal the true identity of the consumer) to the merchant computer. The consumer also transmits the consumer identifier to the billing computer, possibly as part of the authorization code. The billing computer forwards its copy of the consumer identifier to the merchant computer. If the consumer identifier received from the consumer matches the consumer identifier received from the billing computer, the merchant computer then delivers the product to the consumer at the destination specified by the consumer identifier.

In another embodiment, the consumer transmits a fulfillment request and a consumer identifier to the merchant computer. The merchant computer then transmits the consumer identifier to the billing computer, along with a fulfillment approval request. The consumer also transmits a consumer identifier to the billing computer, possibly as part of the authorization code. If the consumer identifier received from the consumer matches the consumer identifier received from the merchant computer, the billing computer transmits a fulfillment approval response to the merchant computer indicating approval to fulfill the transaction. If the consumer identifiers do not match, the billing computer transmits a fulfillment approval response that indicates denial to fulfill the transaction. Assuming the fulfillment approval response is positive, the merchant computer then delivers the product or service to the consumer.

The billing computer can charge the transaction to the consumer billing account by transmitting a charge submission to a consumer billing authority. Alternatively, the billing computer can aggregate two or more transactions, and charge the aggregated transactions to the consumer billing account upon the occurrence of a specified event. Aggregation amortizes processing fees across multiple transactions, thereby making microtransactions profitable for merchants. The system and method of the present invention thus enable merchants to offer microtransactions to consumers. In another embodiment, the billing computer can use predetermined criteria to determine whether each transaction is to be charged directly to the consumer billing account, or aggregated with other transactions and charged to the consumer billing account as an aggregate total.

In an alternative embodiment, the billing computer can obtain a pre-authorization from the consumer billing authority that permits the charging of a predetermined amount to the consumer billing account. Pre-authorization further enables aggregation by ensuring that a consumer billing account can accommodate the charging of aggregated transactions.

In a preferred embodiment, a consumer pre-registers with a billing computer and identifies a credit card account and a personal identification number (PIN) that are to be used to charge transactions. Thereafter, the consumer initiates a transaction by accessing a merchant's web site and placing an order for a product. The merchant computer receives the order and sends information relating to the order to the billing computer, which acts as a third-party billing system. The billing computer creates a transaction corresponding to the order and sends a corresponding transaction identifier to the merchant computer. The merchant computer receives the transaction identifier and transmits a copy to the consumer. The merchant computer then redirects the consumer to the billing computer's web site to authorize the transaction.

The consumer authorizes the transaction by sending the transaction identifier and an authorization code comprising a pre-registered credit card number, a PIN, and a zip code to the billing computer. The consumer also sends an anonymous consumer identifier, such as an Internet Protocol (IP) address, to the billing computer. The billing computer verifies the authorization code and determines whether to approve the transaction. The billing computer then transmits an approval code to the merchant computer, indicating whether the transaction has been approved. The billing computer also redirects the consumer back to the merchant computer's web site. The consumer sends a fulfillment request to the merchant computer, along with a copy of the anonymous consumer identifier. The merchant computer checks to see whether the billing computer has approved the transaction, and whether the consumer identifier sent by the consumer matches the consumer identifier sent by the billing computer. If the transaction has been approved and the consumer identifiers match, the merchant computer electronically transmits the product to the IP address specified by the consumer identifier. The merchant computer then sends an acknowledgment to the billing computer that the product has been delivered. The billing computer either submits the transaction to a consumer billing authority, thereby directly charging the transaction to the credit card account specified in the consumer's authorization code, or aggregates the transaction for later billing to the credit card account as part of an aggregate total.

One advantage of the present invention is that it allows consumers to conduct transactions securely by providing billing information to a third-party billing system rather than to merchants.

Another advantage of the present invention is that it allows consumers to conduct transactions anonymously by providing personal information to a third-party billing system rather than to merchants.

Yet another advantage of the present invention is that it allows consumers to add security to their billing account by associating a PIN code with it.

Yet another advantage of the present invention is that it allows multiple consumers to charge transactions to a billing account, and to allow different restrictions to be set for each consumer on the transactions that can be charged by that consumer.

A further advantage of the present invention is that it allows consumers to conduct transactions without needing to create or remember a new account number.

Yet another advantage of the present invention is that it allows consumers and merchants to conduct microtransactions.

A further advantage of the present invention is that it allows transactions to be aggregated before being charged to a consumer billing account.

Another advantage of the present invention is that it allows a billing account to accommodate aggregated charges by obtaining pre-authorization to charge a predetermined amount to the consumer billing account.

The foregoing and other features, aspects, and advantages of the present invention will become apparent from the following detailed description, which should be read in conjunction with the accompanying drawings.

BRIEF DESCRIPTION OF THE DRAWINGS

The accompanying drawings, which are incorporated into and form a part of the specification, illustrate preferred embodiments of the present invention by way of example, and, together with the description, serve to explain the principles of the invention.

FIG. 4A illustrates the communications that can occur as part of the step of authorizing a transaction in a preferred embodiment of the method of the present invention.

DETAILED DESCRIPTION OF THE PREFERRED EMBODIMENTS

Figure 1:
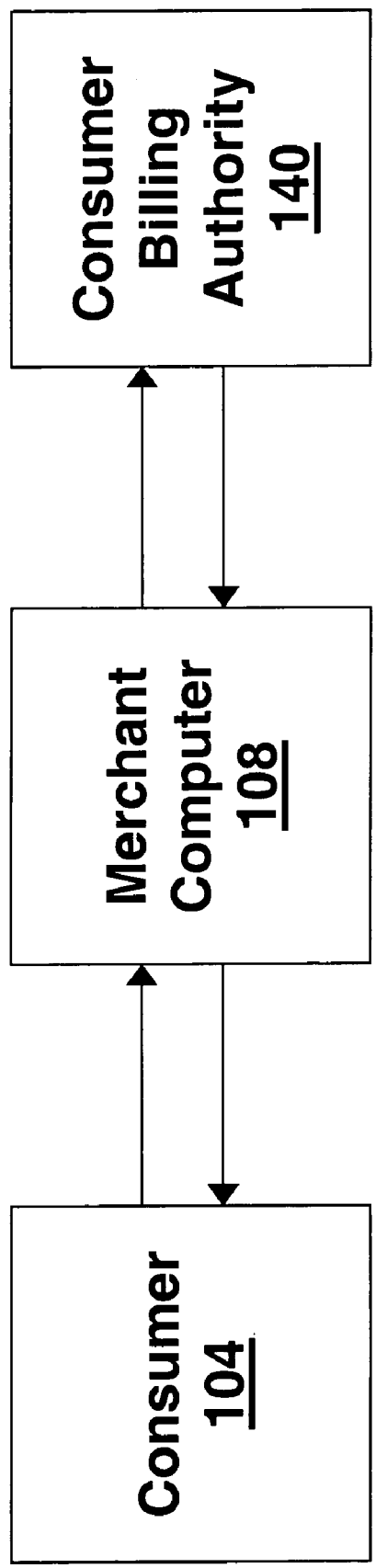
FIG. 1 is a schematic diagram of a prior art e-commerce system.

The present invention will now be described with reference to the accompanying drawings, which are provided as illustrative examples of preferred embodiments of the present invention. In describing the preferred embodiments illustrated in the drawings, specific terminology is used for the sake of clarity. However, the invention is not intended to be limited to the specific terms that are selected. Rather, each specific term is intended to include all equivalents that operate in a similar or substantially similar manner to accomplish a similar or substantially similar result. Notably, the present invention can be implemented using software, hardware, or any combination thereof, as would be apparent to those of skill in the art.

Figure 2:
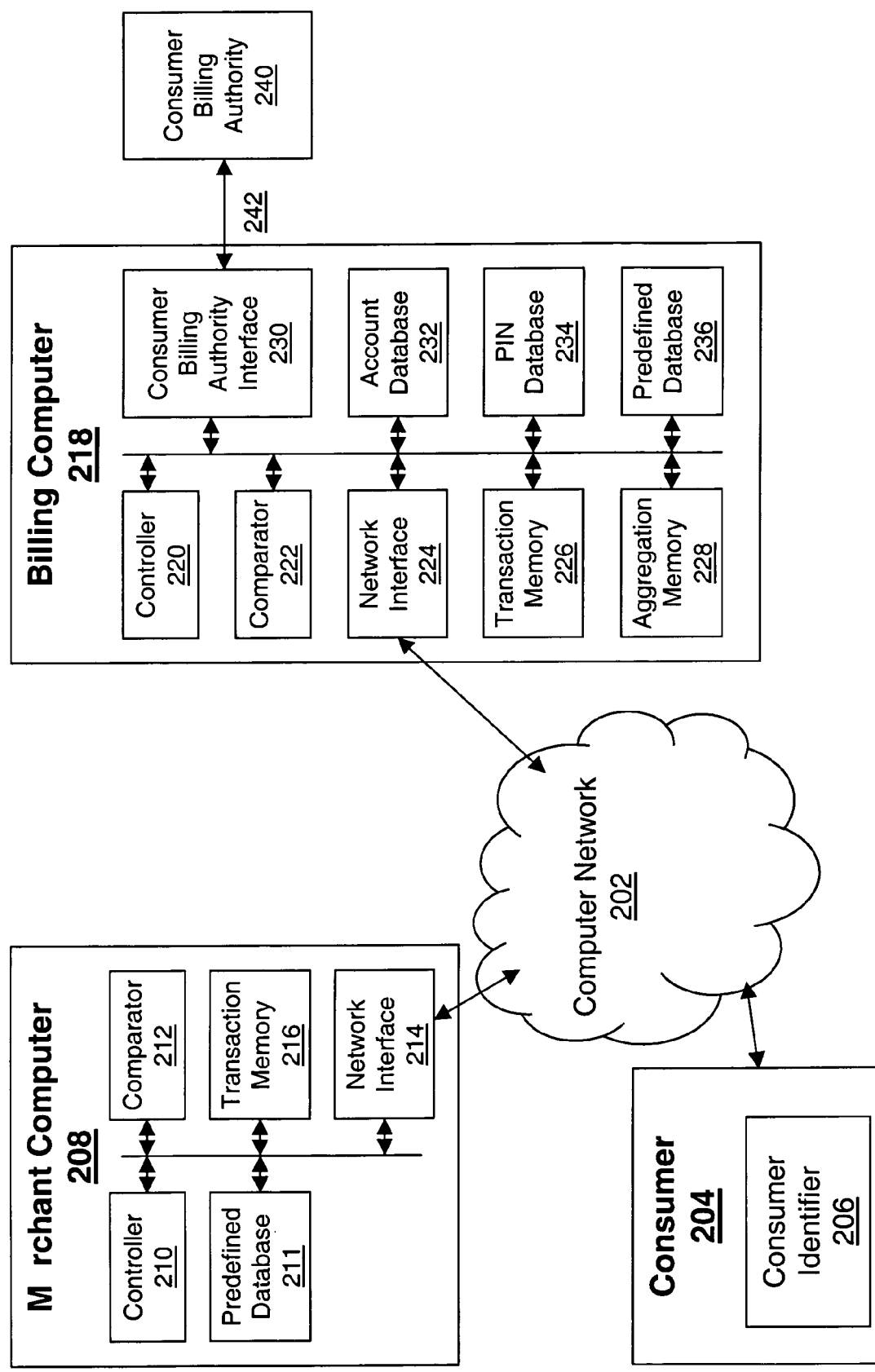
FIG. 2 is a schematic diagram of an e-commerce system in accordance with a preferred embodiment of the invention.

FIG. 2 shows a preferred embodiment of a system that can be used to conduct e-commerce transactions according to the present invention. A consumer 204, a merchant computer 208, and a billing computer 218 are all connected to computer network 202, which provides means for bi-directional communication between any two parties. One example of a suitable network is the Internet, which relies on TCP/IP protocols to communicate among a plurality of computers.

The consumer 204 can connect to the computer network 202 using one of many technologies, such as a personal computer, a network-enabled television, a personal digital assistant, a cellular telephone with built-in computer connectivity such as a microbrowser, or similar technology known to those of skill in the art. Consumer 204 has an associated consumer identifier 206 that uniquely identifies the consumer while the consumer interacts with computer network 202. Consumer identifier 206 should be unique within computer network 202, at least from the time that a transaction is initiated through the time that a transaction is fulfilled.

Additionally, in a preferred embodiment, consumer identifier 206 is independent from the consumer's billing information that is provided to consumer billing authority 240. Such an embodiment allows consumer 204 to engage in transactions in such a way that merchant computer 208 does not receive information that identifies the consumer billing account.

In another preferred embodiment, consumer identifier 206 is anonymous, meaning that it identifies consumer 204 in a way that does not disclose personal information about the consumer. An anonymous consumer identifier contains information that enables merchant computer 208 to deliver a product or service to consumer 204, but does not otherwise identify consumer 204. Such an embodiment allows consumer 204 to engage in transactions anonymously.

Examples of preferred consumer identifiers include computer names, Internet Protocol (IP) addresses, browser identifiers, login identifiers along with domain names, identifiers that identify only the consumer's connection to computer network 202, digital certificates, distinguished names, and smart cards. Other types of consumer identifiers are known to those of skill in the art. As is conventional, most Internet service or network providers assign an IP address to consumers when they log in to the network; consequently, the IP address used by a particular consumer typically changes at each log-in.

One or more merchant computers 208 are connected to computer network 202. FIG. 2 shows a single merchant computer 208 for illustrative purposes only. In the embodiment shown in FIG. 2, merchant computer 208 includes a network interface 214 for communicating with computer network 202, a controller 210 for managing the operation and interaction of the modules within the computer and for executing the methods of the invention for conducting transactions. As shown in the embodiment depicted in FIG. 2, merchant computer 208 can also include the following components: a comparator 212 for comparing values related to the processing of transactions such as consumer identifiers; a transaction memory 216 for storing information about transactions that are in progress or completed; and a predefined database 211 containing descriptions of predefined transactions. One skilled in the art will appreciate that merchant computer 208 can also include numerous conventional hardware and software components for providing information and products to consumers and for conducting transactions over computer network 202. Moreover, some or all of the modules shown in FIG. 2 can be implemented with software, hardware, or both.

A billing computer 218 is configured to communicate with merchant computer 208 and consumer 204 through the computer network 202. In the embodiment shown in FIG. 2, billing computer 218 includes a network interface 224 for connecting to and communicating with computer network 202; a consumer billing authority interface 230 for connecting to and communicating with a consumer billing authority 240 over a connection 242; and a controller 220 for managing the operation and interaction of the modules within the computer and for executing the methods of the invention for conducting transactions. Connection 242 can include an automated or semi-automated connection via a computer network or dedicated computer link, or it can include a manual connection whereby communication requests are handled manually through human intervention.

As shown in the embodiment depicted in FIG. 2, billing computer 208 can also include the following components: a comparator 222 for comparing values related to the approval of transactions such as consumer identifiers; an account database 232 for storing account information such as consumer account numbers, consumer billing account identifiers, or authorization codes for consumers that have registered with billing computer 218; a PIN database 234 for storing information related to approving transactions, a predefined database 236 containing descriptions of predefined transactions; a transaction memory 226 for storing information about transactions that are in progress or completed; and an aggregation memory 228 for storing transactions that are in the process of being aggregated together into one or more billing events for submission to the consumer billing authority. One skilled in the art will appreciate that billing computer 218 can also include numerous conventional hardware and software components for providing information and conducting transactions over computer network 202. Moreover, some or all of the modules shown in FIG. 2 can be implemented with software, hardware, or both.

As shown in the embodiment depicted in FIG. 2, consumer billing authority 240 is a system (e.g., a credit card payment processor) that is external to billing computer 208 and that:
  authorizes the charging of transactions to consumer billing accounts, as referenced by consumer billing account numbers and optionally other associated information;
  charges transactions to consumer billing accounts; and
  settles transactions charged to consumer billing accounts.

One skilled in the art will appreciate that consumer billing authority 240 can also include numerous conventional hardware and software components for providing the above functionality. Moreover, some or all of the modules shown in FIG. 2 can be implemented with hardware, software, or both.

The operation of the embodiment of the e-commerce system shown in FIG. 2 will now be described with reference to FIGS. 3 through 6. The system is used to conduct transactions between consumer 204, merchant computer 208, and billing computer 218, wherein consumer 204 intends to purchase a product or service from merchant computer 208 by charging the value of the product or service to a consumer billing account. Billing computer 218 will ultimately charge the transaction to the consumer billing account, but such a charge can occur after the transaction is complete. Billing computer 218 can also aggregate the transaction with other transactions and charge the aggregated transactions to the consumer billing account, as will be discussed below. Significantly, the transaction is conducted without disclosure of information that identifies the consumer billing account to merchant computer 208. That is, neither consumer 204 nor billing computer 218 transmits to merchant computer 208, and merchant computer 208 does not receive, information identifying the consumer billing account.

The overall method of conducting a transaction of the present invention can be broken down into four main steps, which are illustrated in FIGS. 3 through 6. The four main steps are:
  initiating a transaction (FIG. 3);
  authorizing the transaction (FIGS. 4A, 4B, and 4C);
  approving the transaction (FIG. 5); and
  fulfilling the transaction (FIGS. 6A and 6B).

Each of the four main steps can be further broken down into one or more sub-steps. Although the preferred embodiments described herein list particular combinations of sub-steps for each of the four main steps, the invention is not limited to those particular combinations of sub-steps. Rather, the invention includes within its scope the four main steps, and all possible combinations of the sub-steps that are described herein.

The four main steps, and the corresponding sub-steps that can be (but need not be) used to carry out each of the four main steps, will now be described.

Figure 3:
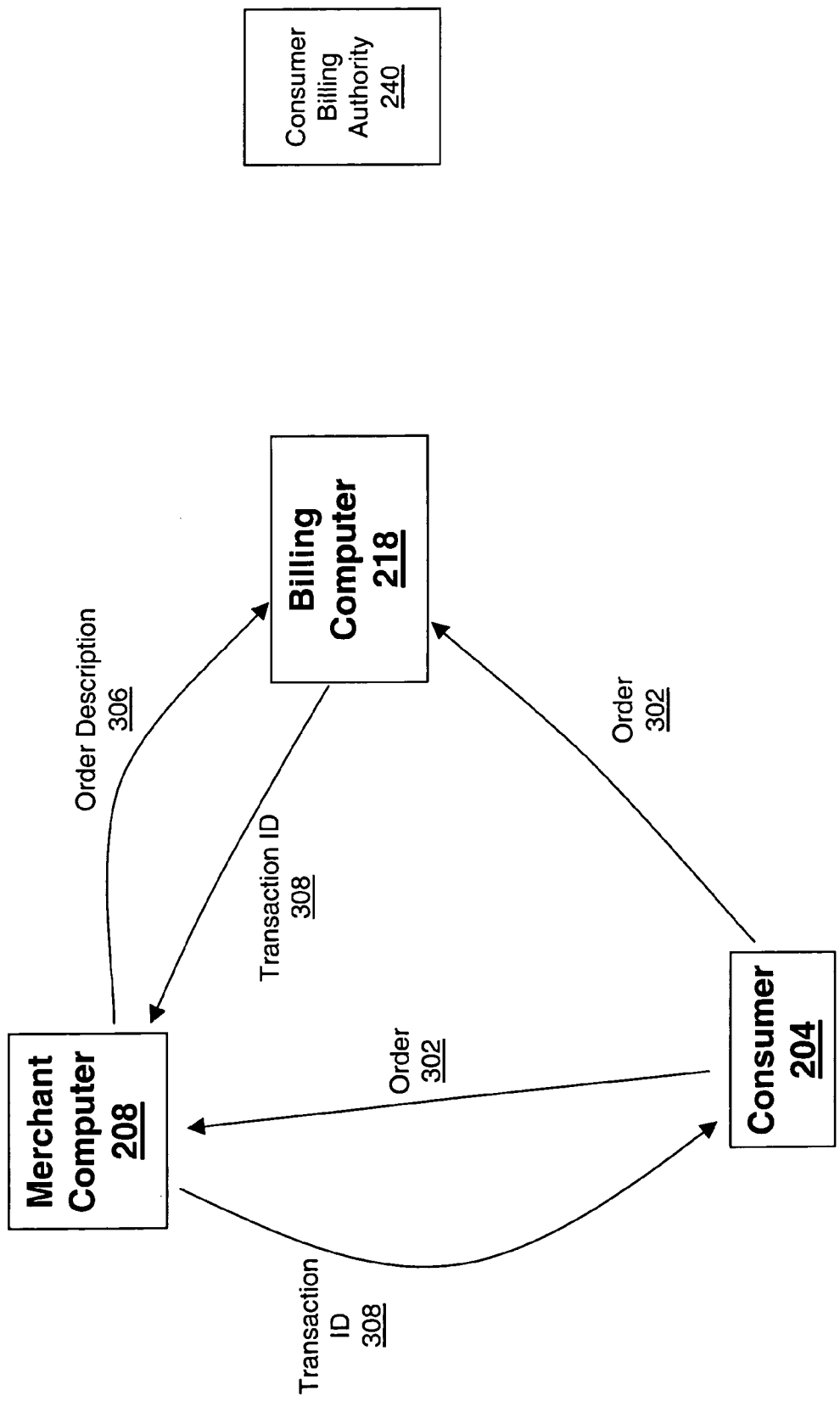
FIG. 3 illustrates the communications that can occur as part of the step of initiating a transaction in a preferred embodiment of the method of the present invention.

FIG. 3 illustrates alternatives for the step of initiating a transaction. In one embodiment of the invention, consumer 204 initiates a transaction by transmitting an order 302 for a product or service to merchant computer 208. Merchant computer 208 can look up the order 302 in a predefined database 211 to retrieve a description of a predefined transaction that can contain additional information about the order 302 (e.g., price, product code, etc.). Merchant computer 208 then transmits an order description 206, which contains information relating to the order, to billing computer 218.

Billing computer 218 then creates a transaction in its transaction memory 226, and returns to merchant computer 208 a transaction ID 308, which is a transaction identification code that can be used to reference the transaction again at a later time. Billing computer 218 can also look up the order in a predefined database 236, which contains descriptions of predefined transactions, in order to retrieve additional information about the order. Information retrieved from predefined database 236 can be used in creating the transaction that is stored in transaction memory 226. The transaction information that is stored in transaction memory 226 can contain information regarding the merchant corresponding to merchant computer 208, the product or service to be sold, the price of the transaction, restrictions associated with the product or service, and other related information.

After receiving transaction ID 308, merchant computer 208 can store transaction ID 308, as well as additional information about the transaction, in transaction memory 216. Finally, merchant computer 208 transmits transaction ID 308 to consumer 204.

In an alternative embodiment, consumer 204 initiates a transaction by transmitting an order 302 for a product or service to merchant computer 208. Merchant computer 208 can look up the order in a predefined database 211 to retrieve a description of a predefined transaction that can contain additional information about the order 302, such as a transaction ID 308. Merchant computer 208 can then store transaction ID 308, as well as additional information about the transaction, in transaction memory 216. Finally, merchant computer 208 transmits transaction ID 308 to consumer 204.

In an alternative embodiment, consumer 204 initiates a transaction by transmitting an order 302 for a product or service directly to billing computer 218. Billing computer 218 then creates a transaction in its transaction memory 226. Billing computer 218 can also look up the order in a predefined database 236, retrieve additional information about the order, and store the additional information in transaction memory 226.

FIG. 4A illustrates alternatives for the step of authorizing a transaction. In one embodiment of the invention, billing computer 218 transmits a transaction description 402 to consumer 204. This step is optional, as consumer 204 can authorize the transaction corresponding to the previously placed order without feedback from billing computer 218.

If consumer 204 wishes to authorize the transaction, consumer 204 transmits an authorization code 404 to billing computer 218, containing billing information related to consumer 204. Authorization code 404 can also comprise authentication information, such as a digital certificate, a password, or a PIN code. Additionally, authorization code 404 can comprise the transaction ID 308 that corresponds to the transaction to be authorized, in which case billing computer 218 can use transaction ID 308 to look up the referenced transaction in transaction memory 226.

The billing information contained within authorization code 404 should identify, either directly or indirectly, the consumer billing account to which consumer 204 wishes to charge the transaction, so that billing computer 218 can later charge the transaction to that consumer billing account through consumer billing authority 240. Accordingly, authorization code 404 can comprise a consumer billing account identifier (such as a consumer billing account number), a consumer account number that billing computer 218 looks up in account database 232 to retrieve a consumer billing account identifier, a digital certificate that contains embedded within it a consumer billing account identifier or a consumer account number, or a digital certificate that contains a reference to an external directory that can be consulted by billing computer 218 to obtain, either directly or indirectly, a billing account identifier.

In a preferred embodiment, authorization code 404 comprises the same consumer billing account number (such as a credit card number or a debit card number) that is submitted to consumer billing authority 240 to charge the transaction to the corresponding consumer billing account. In this way, consumer 204 can use the e-commerce system of the present invention to conduct transactions without needing to create or remember a new account number or some other identification number. For example, a pre-existing credit card or debit card can be used.

In a preferred embodiment, billing computer 218 uses authentication information contained within authorization code 404 to ensure that the consumer submitting authorization code 404 is in fact the consumer authorized to access the identified consumer billing account. Authentication information can comprise data known only to consumer 204, such as a password or PIN. Authentication information can also comprise the capture of a personal signature, a digital signature, biometric data, a digital certificate, or other types of authentication information, as known to those of skill in the art. Billing computer 218 can validate authentication information provided within authorization code 404 by referencing account database 232, PIN database 234, or an external directory.

In a preferred embodiment, authorization code 404 comprises a consumer billing account number and a password. Such an embodiment achieves the effect of transparently "adding" security to the consumer's billing account by permitting the consumer to associate a personal password with the billing account. As one example, consumer 204 can pre-register with billing computer 218 by providing a PIN and credit card number that are to be used for future transactions The authentication information in authorization code 404 need not have a one-to-one correspondence with the underlying consumer billing account. A preferred embodiment of the present invention permits multiple PINs, each of which is associated with a separate consumer, to be associated with a single consumer billing account. In this way, transactions can be charged to a single consumer billing account by multiple consumers. For example, multiple family members can charge transactions to a single credit card. In such an embodiment, billing computer 218 can use the authentication information to provide separate restrictions for different users of the consumer billing account. Restrictions can be directed to spending limits, credit limits, product-type limits, service-type limits, merchant-type limits, or merchant limits. Other types of restrictions can be determined by those of skill in the art. As an example, a parent can authorize a child to charge transactions to the parent's consumer billing account by creating a separate PIN for the child. The parent can then specify restrictions on the child's transactions, such as a credit limit restriction of $20/month, or a type restriction on the types of products or services the child is permitted to purchase. The use of multiple PINs or other authentication codes to control transactions that are authorized by multiple users of a billing account is a feature of the present invention that can be used with a variety of systems and methods, and is not limited to use within the disclosed e-commerce system and methods.

In another embodiment of the present invention, consumer 204 can initiate and authorize a transaction by transmitting an order and an authorization code 404 to billing computer 218 substantially simultaneously. In yet another embodiment, consumer 204 can combine transmission of the order and transmission of the authorization code 404 into one transmission.

Figure 4B:
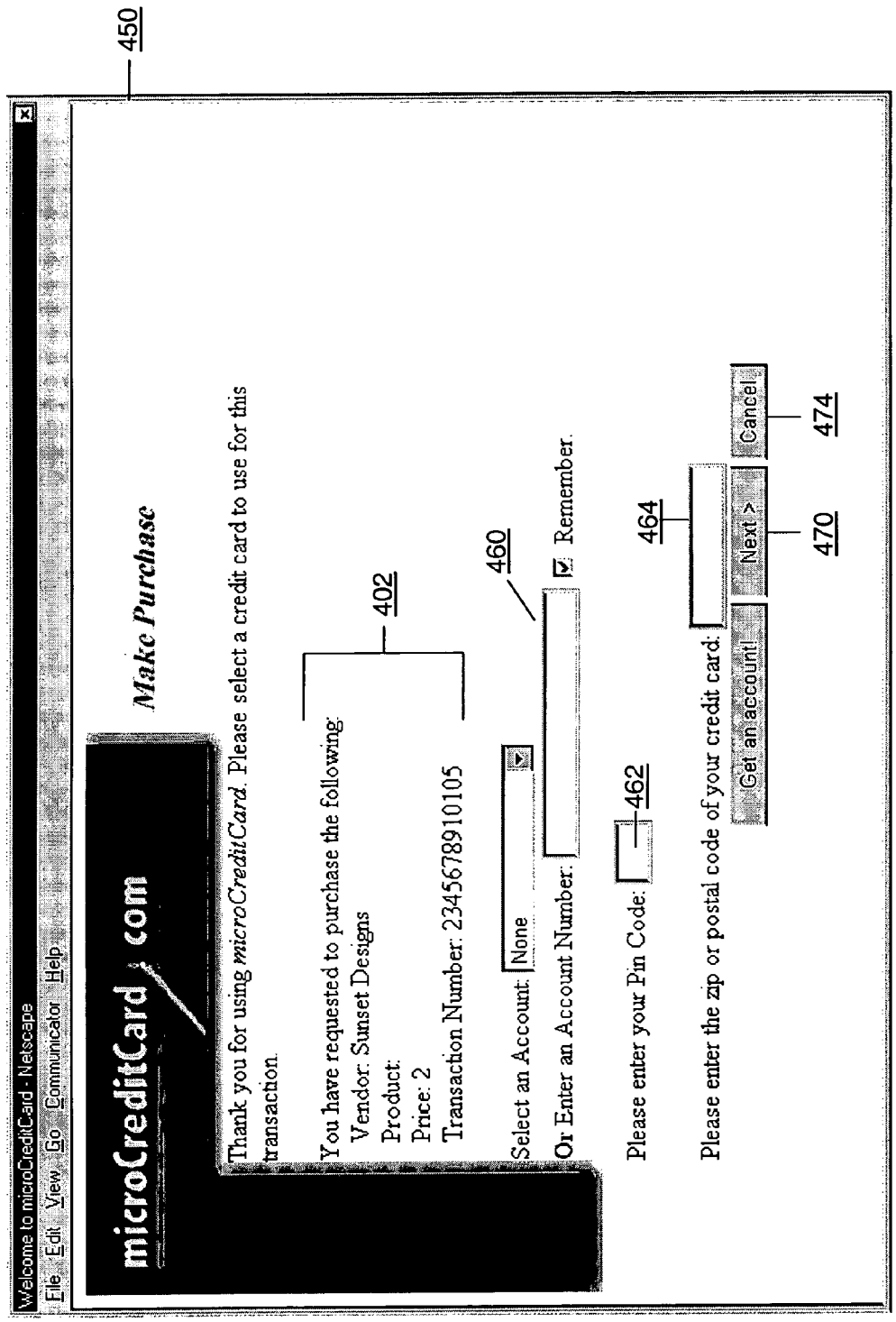
FIGS. 4B and 4C depict web pages through which a consumer authorizes a transaction in a preferred implementation of the system and method of the present invention.
Figure 4C:
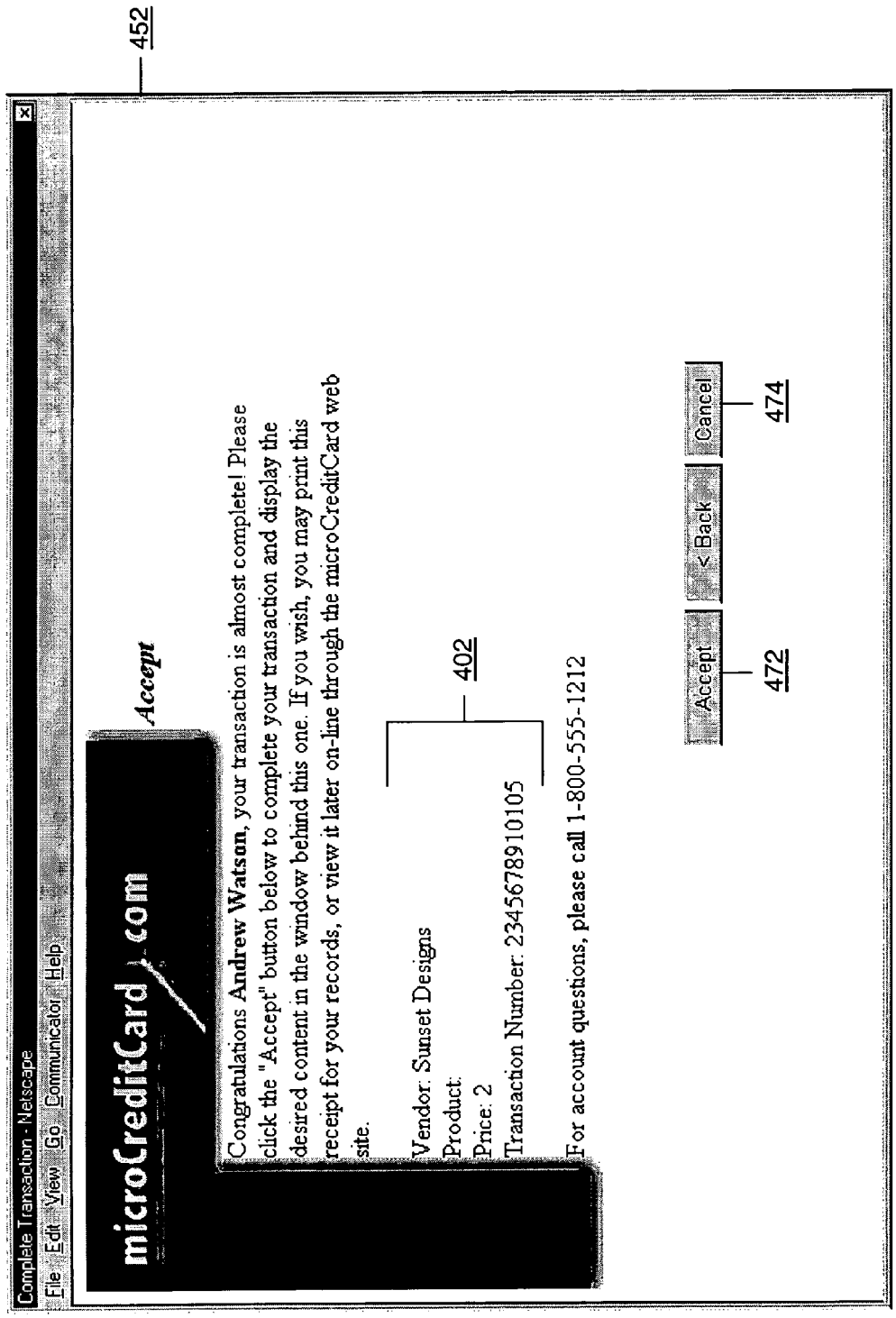

In an embodiment in which consumer 204, merchant computer 208, and billing computer 218 interact via the Internet, an embodiment of the authorization step can include display of transaction description 402 on a web page 450, as illustrated in FIG. 4B. Consumer 204 can then enter an authorization code comprised of an account number, a PIN, and a zip code corresponding to the billing address for the consumer billing account in input boxes 460, 462, and 464, respectively. Consumer 204 can then select the Next button 470 to transmit the authorization code to billing computer 218. Billing computer 218 then verifies the authorization code and approves the transaction. If billing computer 218 approves the transaction, it displays transaction description 402 on a web page 452, as shown in FIG. 4C, and gives consumer 204 one more chance to either accept or decline the transaction. Consumer 204 can complete authorization of the transaction by selecting the Accept button 472. Alternatively, consumer 204 can decline or cancel the transaction by selecting the Cancel button 474.

Figure 5:
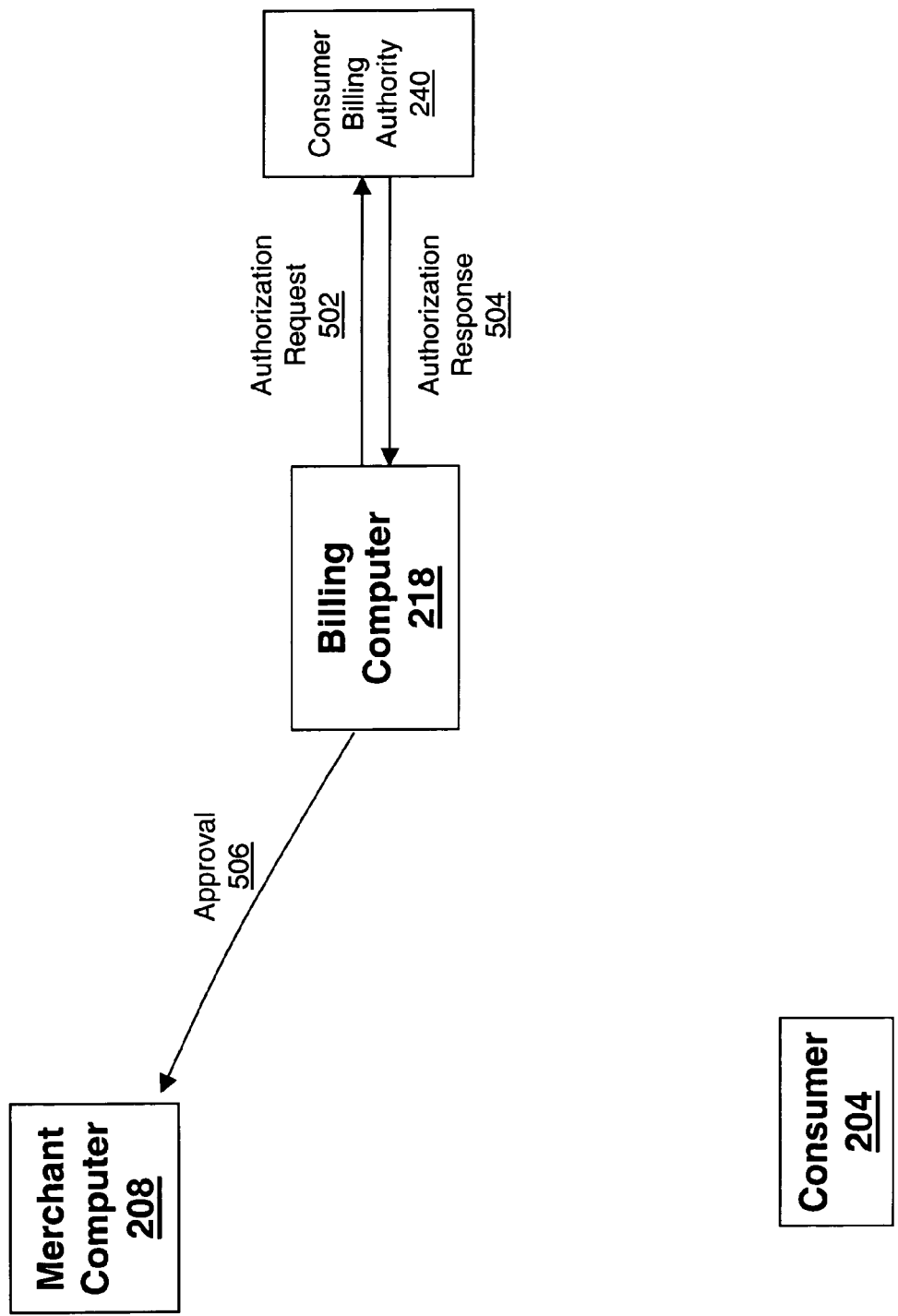
FIG. 5 illustrates the communications that can occur as part of the step of approving a transaction in a preferred embodiment of the method of the present invention.

FIG. 5 illustrates alternatives for the step of approving a transaction. In determining whether to approve a transaction, billing computer 218 considers the authorization code 404 provided by consumer 204. In alternative embodiments, billing computer 218 can also consider other information, such as the value of the product or service that consumer 204 wishes to purchase, or the balance of the consumer billing account to which the transaction is to be charged. In an embodiment in which authorization code 404 comprises authentication information such as a PIN, billing computer 218 can further consider a spending or credit limit, or a product or service limit that can be associated with the authentication information.

In an alternative embodiment, billing computer 218 can transmit an authorization request 502 to consumer billing authority 240, requesting authorization to charge the consumer billing account. Authorization request 502 can include a consumer billing account identifier corresponding to the consumer billing account consumer 204 to which the consumer wishes to charge the transaction; the price of the product or service to be purchased; the nature of the product or service to be purchased; consumer billing account security or authentication information; or other billing information related to consumer 204. Upon consideration of the authorization request 502, consumer billing authority 240 transmits an authorization response 504 back to billing computer 218 that either approves or denies the authorization request. Billing computer 218 can consider authorization response 504 in determining whether to approve the transaction. Consumer billing authority 240 can comprise a conventional computer that authorizes credit card transactions.

After determining whether to approve the transaction, billing computer 218 transmits an approval 506 to merchant computer 208, indicating whether billing computer 218 has approved the transaction. In one embodiment, approval 506 comprises the transaction ID 308 corresponding to the transaction being conducted, which allows merchant computer 208 to correlate the transaction to the consumer ID (but not the true identity of the consumer). Finally, in a preferred embodiment, billing computer 218 updates the information regarding the transaction in transaction memory 226.

Figure 6A:
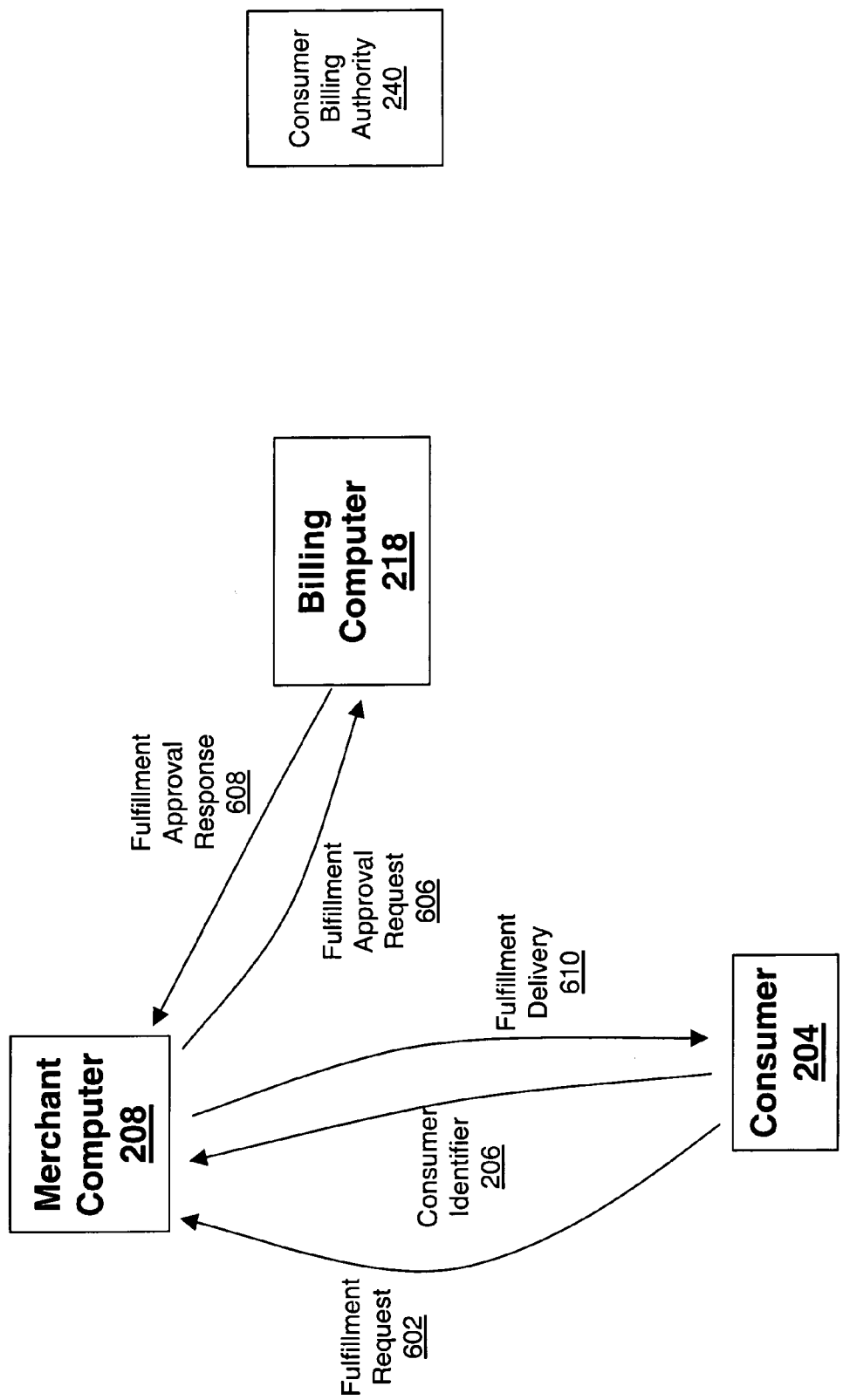
FIGS. 6A and 6B illustrate the communications that can occur as part of the step of fulfilling a transaction in a preferred embodiment of the method of the present invention.
Figure 6B:
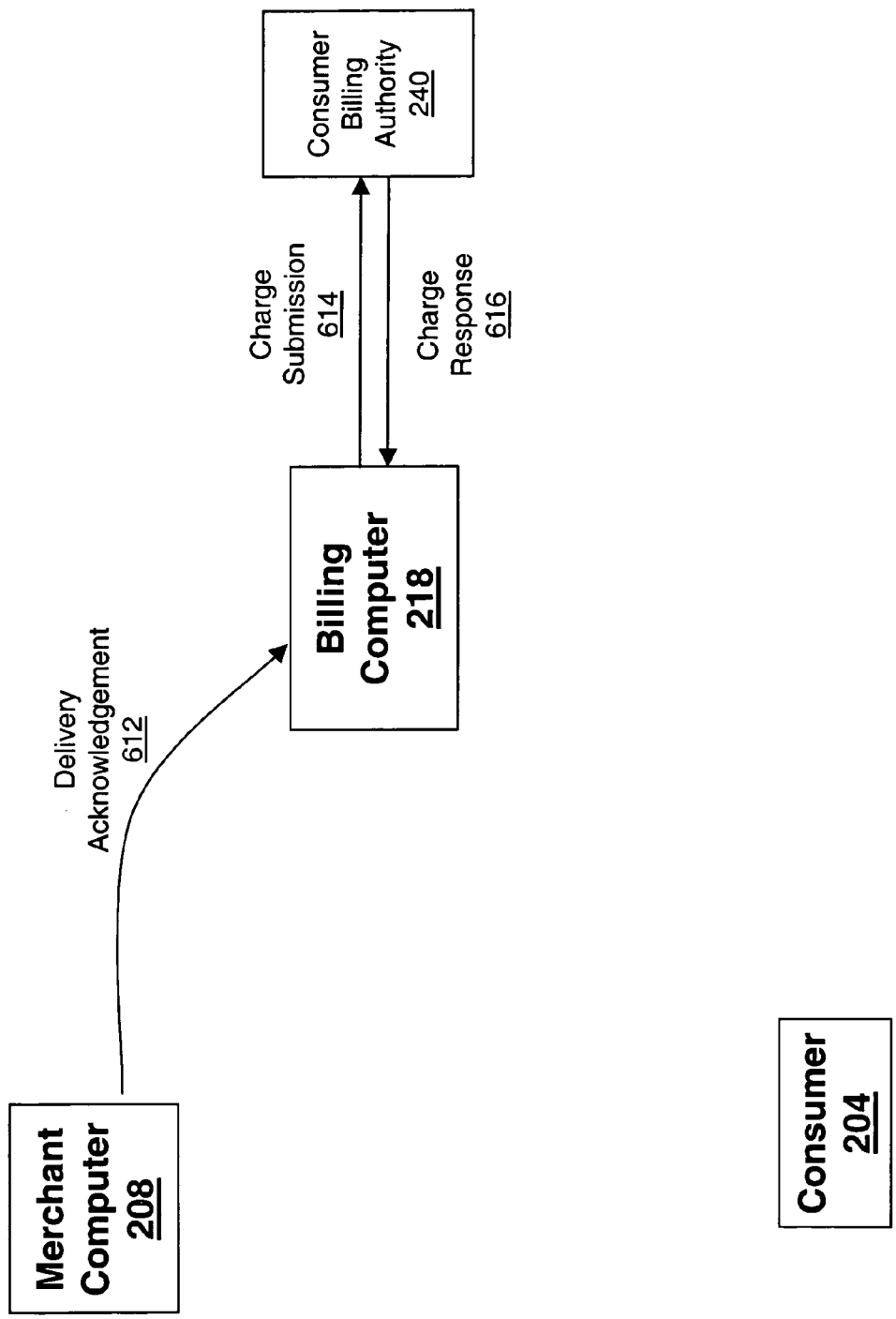

If billing computer 218 approves the transaction, the transaction is then fulfilled. FIGS. 6A and 6B illustrate alternatives for the step of fulfilling a transaction. In the simplest embodiment, merchant computer 208 transmits delivery fulfillment 610 to consumer 204, which comprises delivery of the product or service to consumer 204. The product or service can be delivered to consumer 204 by electronic transmission.

In an alternative embodiment, consumer 204 transmits a fulfillment request 602 to merchant computer 208. Consumer 204 can also transmit consumer identifier 206 to merchant computer 208; this consumer identifier can be transmitted separately, or it can be transmitted as part of fulfillment request 602. Consumer 204 can also transmit consumer identifier 206 to billing computer 218; this consumer identifier can be transmitted separately, or it can be transmitted as part of authorization code 404. Billing computer 218 can then transmit consumer identifier 206 to merchant computer 208; this consumer identifier can be transmitted separately, or it can be transmitted as part of approval 506.

Merchant computer 208 then determines whether to fulfill the fulfillment request 602. In making that determination, merchant computer 208 can consider any of the information it has received regarding the transaction, as well as any information about the transaction it has stored in transaction memory 216. Merchant computer 208 can also use comparator 212 to compare the consumer identifier 206 transmitted by consumer 204 to merchant computer 208, and the consumer identifier 206 transmitted by consumer 204 to billing computer 218 and forwarded by billing computer 218 to merchant computer 208. If the two consumer identifiers match, and merchant computer 208 determines to fulfill the fulfillment request 602, merchant computer 208 then transmits delivery fulfillment 610 to consumer 204.

In an alternative embodiment, consumer 204 transmits a fulfillment request 602 to merchant computer 208. Consumer 204 can also transmit consumer identifier 206 to merchant computer 208; this consumer identifier can be transmitted separately, or it can be transmitted as part of fulfillment request 602. Consumer 204 can also transmit consumer identifier 206 to billing computer 218; this consumer identifier can be transmitted separately, or it can be transmitted as part of authorization code 404.

Merchant computer 208 then transmits a fulfillment approval request 606 to billing computer 218. Merchant computer 208 can also transmit consumer identifier 206 to billing computer 218; this consumer identifier can be transmitted separately, or it can be transmitted as part of fulfillment approval request 606.

Billing computer 218 then determines whether to approve the fulfillment approval request 606. In making that determination, billing computer 218 can consider any of the information it has received regarding the transaction, as well as any information about the transaction it has stored in transaction memory 226. Billing computer 218 can also use comparator 222 to compare the consumer identifier 206 transmitted by consumer 204 to billing computer 218, and the consumer identifier 206 transmitted by consumer 204 to merchant computer 208 and forwarded by merchant computer 208 to billing computer 218. If the two consumer identifiers match, and billing computer 218 determines to approve the fulfillment approval request 606, billing computer 218 transmits a fulfillment approval response 608 to merchant computer 208 that indicates approval to fulfill the transaction. Otherwise, billing computer 218 transmits a fulfillment approval response 608 to merchant computer 208 that indicates denial to fulfill the transaction. Finally, if fulfillment approval response 608 indicates approval to fulfill the transaction, merchant computer 208 transmits delivery fulfillment 610 to consumer 204.

In yet another embodiment, consumer 204 transmits a fulfillment request 602 to merchant computer 208. Consumer 204 can also transmit consumer identifier 206 to merchant computer 208; this consumer identifier can be transmitted separately, or it can be transmitted as part of fulfillment request 602. Consumer 204 can also transmit consumer identifier 206 to billing computer 218; this consumer identifier can be transmitted separately, or it can be transmitted as part of authorization code 404.

Merchant computer 208 then transmits a fulfillment approval request 606 to billing computer 218. Merchant computer 208 can also transmit consumer identifier 206 to billing computer 218; this consumer identifier can be transmitted separately, or it can be transmitted as part of fulfillment approval request 606.

Billing computer 218 then determines whether to approve the fulfillment approval request 606. In making that determination, billing computer 218 can consider any of the information it has received regarding the transaction, as well as any information about the transaction it has stored in transaction memory 226. If billing computer 218 determines to approve the fulfillment approval request 606, billing computer 218 transmits a fulfillment approval response 608 to merchant computer 208 that indicates approval to fulfill the transaction. Otherwise, billing computer 218 transmits a fulfillment approval response 608 to merchant computer 208 that indicates denial to fulfill the transaction. Billing computer 218 can also transmit the consumer identifier 206 that it received from consumer 204 to merchant computer 208;

this consumer identifier can be transmitted separately, or it can be transmitted as part of fulfillment approval response 608.

Merchant computer 208 then determines whether to fulfill the fulfillment request 602. In making that determination, merchant computer 208 can consider any of the information it has received regarding the transaction, as well as any information about the transaction it has stored in transaction memory 216. Merchant computer 208 can also consider fulfillment approval response 608. Merchant computer 208 can also use comparator 212 to compare the consumer identifier 206 transmitted by consumer 204 to merchant computer 208, and the consumer identifier 206 transmitted by consumer 204 to billing computer 218 and forwarded by billing computer 218 to merchant computer 208. If the two consumer identifiers match, and merchant computer 208 determines to fulfill the fulfillment request 602, merchant computer 208 then transmits delivery fulfillment 610 to consumer 204.

As part of fulfilling the transaction, billing computer 218 can charge the transaction to the consumer billing account. In one embodiment, billing computer 218 transmits charge submission 614 to consumer billing authority 240, as shown in FIG. 6B. Consumer billing authority 240 then transmits charge response 616 to billing computer 218. Charge response 616 can indicate the status of the charge, including whether the charge succeeded or failed.

In another embodiment, charge submission 614 can be conducted in conjunction with authorization request 502, so as to ensure the success of the charge. In such an embodiment, billing computer 218 can store the information required to coordinate authorization request 502 and charge submission 614 in transaction memory 226.

In an alternative embodiment, merchant computer 208 transmits delivery acknowledgment 612 to billing computer 218. Delivery acknowledgment 612 indicates the status of the delivery of the product or service. Billing computer 218 then transmits charge submission 614 to consumer billing authority 240 only if delivery acknowledgment 612 indicates that fulfillment delivery 610 to consumer 204 has been completed. This embodiment has the advantage of ensuring that the product or service is delivered to consumer 204 successfully before the transaction is charged to the consumer billing authority 240.

In an alternative embodiment, the system and methods of the present invention are used to conduct multiple transactions between a consumer 204 and one or more merchant computers 208. In such an embodiment, billing computer 218 need not charge each individual transaction to the consumer billing account. Billing computer 218 can instead aggregate two or more transactions, and charge the aggregated transactions to the consumer billing account.

More specifically, billing computer 218 can store some completed transactions in an aggregation memory 228. Note that billing computer 218 can receive a delivery acknowledgment for all, some, or none of the completed transactions. Billing computer 218 can then aggregate the completed transactions into a single billing event for submission to consumer billing authority 240. In other words, billing computer 218 can aggregate the completed transactions and submit them to consumer billing authority 240 via one charge submission 614. In that way, the aggregated transactions are charged to the consumer billing account as one billing event. In an alternative embodiment, billing computer 218 can aggregate completed transactions into more than one billing event for submission to consumer billing authority 240.

Billing computer 218 can charge aggregated transactions to a consumer billing account upon the occurrence of a specified event. In one embodiment, billing computer 218 charges the aggregated transactions when the number of aggregated transactions exceeds a predetermined number threshold. In another embodiment, billing computer 218 charges the aggregated transactions when a predetermined period of time expires. In yet another embodiment, billing computer 218 charges the aggregated transactions when the sum of the aggregated transactions (i.e., the sum total of the amounts of the aggregated transactions) exceeds a predetermined amount threshold. Other suitable triggering events for submitting aggregated transactions to consumer billing authority 240 can be determined by those of skill in the art. The triggering event is preferably chosen such that it is profitable for billing computer 218 to charge the aggregated transactions to the consumer billing account, in light of the processing fees that are charged by consumer billing authority 240 and other payment processing firms and financial institutions.

In an alternative embodiment, billing computer 218 can use predetermined criteria to determine whether each transaction is to be charged directly to the consumer billing account, or aggregated with other transactions and charged to the consumer billing account as an aggregate total. In one embodiment, the predetermined criteria comprises a pass-through threshold amount. In such an embodiment, transactions above the pass-through threshold amount are charged to the consumer billing account individually, whereas transactions below the pass-through threshold amount are aggregated and charged to the consumer billing account as an aggregate total. For example, in an embodiment in which the pass-through threshold amount is set to $8, a $20 charge incurred for downloading a software program would be charged to the consumer billing account directly, while a $0.25 charge incurred for downloading a picture would be aggregated with other microtransactions and submitted as part of an aggregate charge at a later time. In another embodiment, the predetermined criteria for determining whether to aggregate a transaction comprises the type of the transaction. Other suitable criteria for determining whether to aggregate a transaction can be determined by those of skill in the art. Suitable triggering events for charging the aggregated transactions to the consumer billing account can also be determined by those of skill in the art.

In an alternative embodiment, billing computer 218 can obtain a pre-authorization from the consumer billing authority that permits charging a predetermined amount to the consumer billing account. Such a pre-authorization can be used to ensure that the consumer billing account can accommodate the charging of aggregated transactions. Billing computer 218 can obtain a pre-authorization by transmitting an authorization request 502 to consumer billing authority 240, and receiving an authorization response 504 in response.

In one embodiment, billing computer 218 obtains pre-authorization as part of the approval step of conducting a transaction. In alternative embodiments, billing computer 218 can obtain pre-authorization when the consumer registers with the billing computer, when a predetermined period of time passes after the previous pre-authorization, or when the sum of a number of aggregated transactions exceeds a predetermined amount. Other suitable triggering events for obtaining a pre-authorization can be determined by those of skill in the art.

Aggregation and pre-authorization, used either independently or in conjunction, are features of the present invention that can be used with a variety of systems and methods, and are not limited to use within the disclosed e-commerce system and methods.

Although the system and methods of the present invention have been described from an overall perspective, the invention is not directed solely to the overall system and the overall methods. Rather, the invention includes within its scope the independent merchant computer and billing computer portions of the system, as well as the corresponding portions of the methods that are executed at the merchant computer and at the billing computer.

Moreover, although the invention has been particularly described by reference to specific embodiments, it should be readily apparent to those of ordinary skill in the art that various changes and modifications can be made in form and details without departing from the spirit and scope of the invention. The appended claims are intended to cover such changes and modifications, so as to afford broad protection to the invention and its equivalents.

The steps of the method claims need not be practiced in the specific order listed, and such ordering should not be interpreted as limiting the scope of the invention.

What is claimed is:

1. A method of conducting a multiplicity of transactions between a consumer, at least one merchant computer, and a billing computer connected together over a computer network, wherein each transaction is for a product or service that the consumer purchases by using one of the at least one merchant computers, the method comprising:
   (a) determining at a time of each transaction whether a transaction amount exceeds a pass-through amount and if so, charging the transaction amount directly to the consumer billing account and bypassing steps (b) and (c);
   (b) aggregating a multiplicity of transactions that involve the consumer;
   (c) upon the occurrence of an event, charging the aggregated multiplicity of transactions to a consumer billing account;
   (d) obtaining a first pre-authorization from the consumer billing authority that permits charging a predetermined amount to the consumer billing account; and
   (e) obtaining a second pre-authorization from the consumer billing authority within a predetermined period of time from said step of obtaining the first pre-authorization;
   wherein the first pre-authorization expires at the end of the predetermined period of time.

2. The method of claim 1, further comprising the steps of:
   (e) identifying one or more additional transactions that meet predetermined criteria; and
   (f) individually charging each transaction of the identified additional transactions to the consumer billing account.

3. The method of claim 1, further comprising prior to the step for aggregating the step of:
   determining whether or not to perform step a) based on a type of each transaction.

4. A method of conducting a multiplicity of transactions between a consumer and at least one merchant computer at a billing computer, wherein:
   the consumer, the at least one merchant computer, and the billing computer are connected together over a computer network;
   each transaction is for a product or service that the consumer purchases by accessing the at least one merchant computer; and
   the method comprises the steps of conducting for each of the multiplicity of transactions:
   (1) initiating the transaction for the product or service;
   (2) receiving an authorization from the consumer indicating authorization to conduct the transaction;
   (3) determining whether to approve the transaction by considering the authorization;
   (4) transmitting approval to conduct the transaction to the merchant computer if the transaction is approved;
   (5) obtaining from a consumer billing authority a first pre-authorization that permits charging a predetermined amount to a consumer billing account;
   (6) obtaining a second pre-authorization from the consumer billing authority within a predetermined period of time from said step of obtaining the first pre-authorization, wherein the first pre-authorization expires at the end of the predetermined period of time;
   (7) determining at a time of each transaction whether a transaction amount exceeds a pass-through amount and if so, charging the transaction amount directly to the consumer billing account and bypassing steps (8) and (9);
   (8) aggregating the multiplicity of transactions; and
   (9) upon the occurrence of an event, charging the aggregated multiplicity of transactions to the consumer billing account;
   wherein the billing computer does not transmit information identifying the consumer billing account to the merchant computer.

5. A method of conducting a multiplicity of transactions between a consumer and at least one merchant computer at a billing computer, wherein:
   the consumer, the at least one merchant computer, and the billing computer are connected together over a computer network;
   each transaction is for a product or service that the consumer purchases by accessing the at least one merchant computer; and
   the method comprises the steps of conducting for each of the multiplicity of transactions:
   (1) initiating the transaction for the product or service;
   (2) receiving an authorization from the consumer indicating authorization to conduct the transaction;
   (3) determining whether to approve the transaction by considering the authorization;
   (4) transmitting approval to conduct the transaction to the merchant computer if the transaction is approved;
   (5) determining a transaction amount corresponding to the transaction;
   (6) comparing the transaction amount to a predetermined pass-through amount;
   (7) charging the transaction amount directly to a consumer billing account if the transaction amount equals or exceeds the predetermined pass-through amount;
   (8) obtaining a first pre-authorization from a consumer billing authority that permits charging a predetermined amount to the consumer billing account; and
   (9) obtaining a second pre-authorization from the consumer billing authority within a predetermined period of time from said step of obtaining the first pre-authorization;

(10) aggregating the transaction if the transaction amount does not equal or exceed the predetermined pass-through amount into a set of aggregated transactions; and

(11) charging the set of aggregated transactions to the consumer billing account upon the occurrence of an event;

wherein the billing computer does not transmit information identifying the consumer billing account to the merchant computer; and wherein said first pre-authorization expires at the end of said predetermined period of time.

6. The method of claim 5, wherein the step of receiving an authorization from the consumer includes redirecting the consumer to a web site of the billing computer for receiving the authorization.

7. The method of claim 5, wherein the event comprises either a total monetary value of the aggregated multiplicity of transactions exceeding a predetermined monetary value, or expiration of a predetermined time period.

8. A method of charging for a multiplicity of online transactions that involve a consumer, the method comprising:

(a) determining at a time of each transaction whether a transaction amount exceeds a pass-through amount and if so, charging the transaction amount directly to the consumer billing account and bypassing steps (b) and (c);

(b) aggregating at a billing computer a multiplicity of transactions that involve the consumer;

(c) charging the aggregated multiplicity of transactions upon the occurrence of an event to a consumer billing account;

(d) obtaining a first pre-authorization from a consumer billing authority that permits charging a predetermined amount to the consumer billing account; and (e) obtaining a second pre-authorization from the consumer billing authority within a predetermined period of time from said step of obtaining the first pre-authorization.

9. The method of claim 8, wherein the event comprises a total monetary value of the aggregated multiplicity of transactions exceeding a predetermined monetary value.

10. The method of claim 8, wherein the event comprises a total number of the aggregated multiplicity of transactions exceeding a predetermined number.

11. The method of claim 8, wherein the event comprises a total time period elapsed since a transaction in the multiplicity of transactions exceeding a predetermined time period.

12. The method of claim 8, further including determining if a new transaction exceeds a predetermined monetary value and aggregating the new transaction in (a) only when the new transaction does not exceed the predetermined monetary value.

* * * * *